Nov. 22, 1949 S. D. RUSSELL 2,489,199
PICKUP DRIVE
Filed March 14, 1945 2 Sheets-Sheet 2
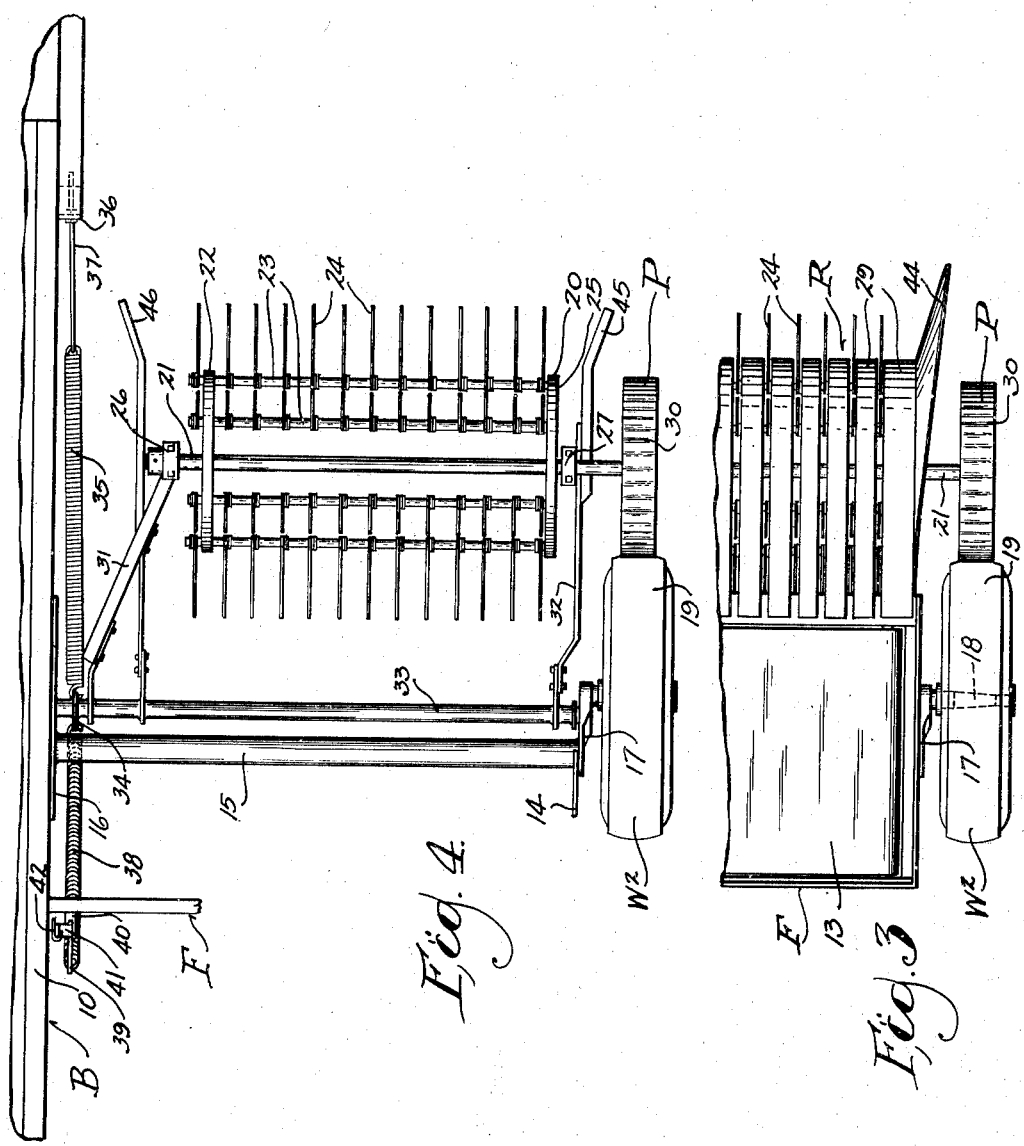
INVENTOR
Stanley D Russell
BY
Emerson B Donnell
ATTORNEY Patented Nov. 22, 1949

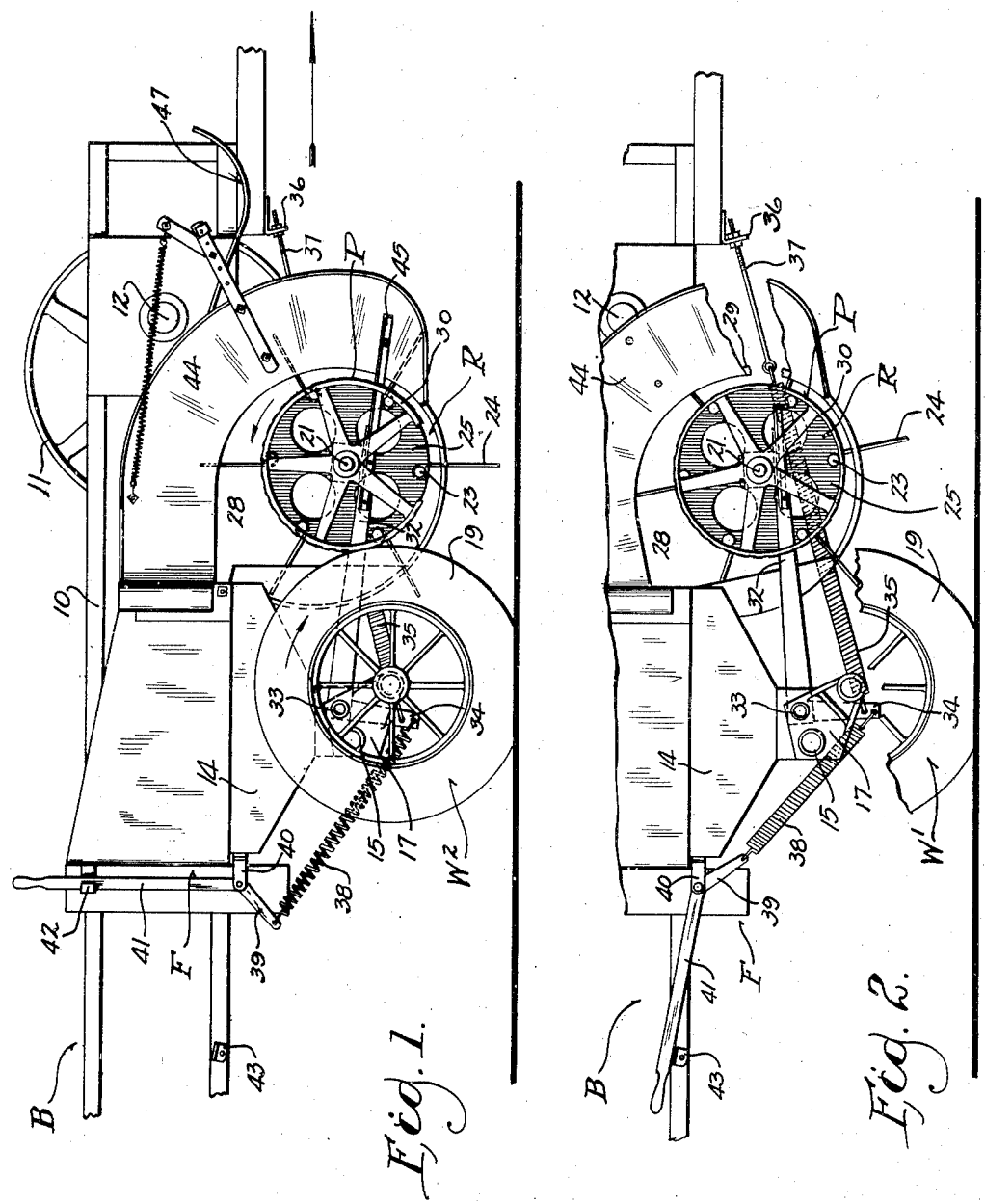

2,489,199

UNITED STATES PATENT OFFICE 2,489,199

PICKUP DRIVE

Stanley D. Russell, Racine, Wis., assignor to J. I. Case Company, Racine, Wis., a corporation of Wisconsin Application March 14, 1945, Serial No. 582,762

10 Claims. (Cl. 100—25)

The present invention relates to balers and an object thereof is to generally improve the construction and operation of devices of this class. More particularly it relates to balers which travel in the field and pick up hay, straw, or the like and compress or bale it as they go. Machines of this character are already known and they generally comprise the baling mechanism and some sort of a feeding device transporting the picked up material into the baler. Such a machine also includes a pickup, adapted to gather the material from the ground and the pickup has more or less complicated driving mechanism for operating it at a rate proportional to the rate of travel of the machine over the ground. It is desirable that such mechanism be provided with expedients for starting and stopping the pickup when desired, but these are often omitted for the sake of simplicity. The principal object, therefore, is to provide a mechanism for driving the pickup in a pickup baler which will have the advantages of simplicity, directness and convenience of starting and stopping the pickup when desired.

Another object is to eliminate the usual chain and sprocket or gear drive to the pickup.

Another object is to eliminate parts which would be subject to wear, thereby saving the labor required to replace them and also the time when the machine would be out of service for making repairs. Further objects will be evident upon consideration of the following description and accompanying drawings in which a satisfactory embodiment of the invention is shown. However, it is to be understood that the invention is not limited to the details disclosed but includes all such variations and modifications as fall within the spirit of the invention as herein expressed.

As seen in the drawings,

Figure 1 is a right side elevation of so much of a pickup baler as is necessary to illustrate the invention.

Fig. 2 is a similar view with parts broken away and others in a different position.

Fig. 3 is a plan view of a portion of the machine shown in Fig. 1.

Fig. 4 is a similar view with parts removed to show constructions lying beneath them.

In general, the machine comprises a baler, generally designated as B, provided with a laterally extending feeding conveyor frame F and a pickup reel R. Wheel W1 (Fig. 2) supports the baler for transportation over the ground and another wheel W2 supports frame F thereby providing a two point support for the combined structure. The baler is supported on a third point in well-known manner not shown, but commonly on a tractor or other vehicle used for propelling the baler. Since the latter expedient is well-known and forms no part of the present invention, it is not necessary to describe further, a full disclosure of a baler of this general type being available in the patent to Russell 2,362,861, November 14, 1944, filed April 19, 1941. A friction drive pulley, roller or member P contacts wheel W2 when it is desired to drive pickup reel R, thereby imparting rotation to the reel from movement of wheel W2. It will thus be seen that reel R is rotated at a rate proportional to travel of baler B over the ground and that the rotation may be started and stopped by establishing or interrupting contact of member P with wheel W2.

Returning to a more detailing description of the device, baler B comprises a bale case 10 forming a longitudinal body portion for the baler, a fly wheel 11 serving as a power input element and driving a crank shaft of well-known type journaled in a bearing 12. Material is compressed in well-known manner by a plunger, not shown, actuated from the crank shaft. These parts forming no part of the invention, are not further described. Material to be compressed is conveyed into bale case 10 by means of an apron 13 carried in feeder frame F and caused to move toward the bale case in any suitable manner, not shown, as forming no part of the present invention. Feeder frame F has a plate 14 forming the outer extremity thereof and which is fixed in any suitable manner to an axle 15 mounted on bale case 10 by suitable means such as a plate 16. Axle 15 and plate 14 are united with a fitting 17 rigid with a stub axle 18 on which is journaled above mentioned wheel W2. In this manner, the extremity of feeder frame F is supported from the ground by means of wheel W2. Wheel W2 is equipped with a pneumatic or other suitable cushioning or resilient tire 19 which cushions the mechanism against excessive shocks as the baler progresses over rough surfaces.

Pickup R is generally of a well-known type, comprising in the present instance a cage-like reel structure generally designated as 20, built on a shaft 21 and comprising a head 22 and a series of shafts or pipes 23—23 having outwardly extending spring fingers 24—24. Shafts 23 are carried at their opposite ends by a head 25, heads 22 and 25 being rigidly mounted on shaft 21. Shafts 23 are fixed in heads 22 and 25 and fingers 24, while yieldable, are mounted at least nominally in fixed position on shafts 23. In other words, fingers 24 extend from reel 20 each in a fixed position unless or until a load is imposed on them, whereupon they may yield slightly. In the event of an encounter with an obstruction they can yield a substantial amount without damage. A simple cage-like structure is thereby provided having a comb-like set of pickup fingers projecting therefrom. Shaft 21 is supported in journal bearings 26 and 27, in a manner which will be further described presently so that reel R may rotate within a space 28 formed within a series of strips or shrouds 29—29, suitably supported from feeder frame F as will appear. Strips 29 are spaced apart and fingers 24 project between them into contact or close proximity with the ground as seen best in Fig. 1. Reel R rotates in the direction indicated and elevates the material to be picked up in front of strips 29, sliding the material gently over the strips and onto apron 13. Strips 29 become highly polished after a short period of operation and the hay or other material slides over them with very little disturbance. Strips 29 gradually recede from a position close to shafts 23 so that in effect fingers 24 disappear into space 28 at a point somewhat to the rear of and above shaft 21, it being understood that the baler proceeds from left to right as seen in Fig. 1.

As will now be apparent, it is desirable that the motion of fingers 24 will be a definite function of the rate of travel of the baler over the ground. If the finger movement should be too fast, obviously the stream of material would be torn apart with an undesirable shattering effect on the leaves. On the other hand, if the movement were too slow, the material would not be lifted as fast as it was presented to the pickup by the relative forward movement of the machine.

Thus, since the volume of the crop varies from field to field, thereby dictating a different rate of travel in one field than another, a constant rate of rotation of reel R would not be correct except in the case of some one particular field which happened to have exactly the right amount of crop. However, the travel of the baler, as above stated, is determined in accordance with the crop. Also, the rotation of wheel W2 is, of course, proportional to the rate of travel. Advantage is taken of this to obtain a proportional rotation of reel R.

For this purpose, shaft 21 carries a pulley, roller or member 30 which is pressed into frictional contact with tire 19 when rotation of reel R is desired. Referring to Fig. 1, it will be apparent that rotation of pulley 30 will be opposite to rotation of wheel W2 and which is the desired direction of rotation of reel R. Also the correct ratio of movement of reel R and therefore of fingers 24 is established by determining the correct diameter of pulley 30 as compared with tire 19. Member 30 may be given a rough or traction promoting surface within the contemplation of the invention.

Returning to bearings 26 and 27, as best seen in Fig. 4, they are supported respectively on arms 31 and 32 projecting forwardly from a rock shaft or pipe 33 pivotally supported in the present instance from plate 16 and fitting 17. Shaft 33 has a downwardly extending arm 34 which is urged in a forward direction by a spring 35 anchored to bale case 10 at 36 by a suitable adjusting bolt 37 or the like. Spring 35 is tensioned in the present instance sufficiently to overcome the weight of reel R and its associated parts so that shaft 33 is rocked in a counter-clockwise direction, thus raising the entire pickup assembly to the position indicated in Fig. 2. Reel R is then out of contact with the ground and supported in an inoperative position.

The centers of stub axle 18 and rock shaft 33 are so related that pulley 30, in this position of the parts, has moved away from tire 19 so that no frictional contact exists between the two. This comprises a declutched position and reel R is therefore not needlessly rotated when the machine is being transported and not otherwise operating.

To obtain an operative position of reel R, spring 35 is overcome so as to rock shaft 33 in a clockwise direction. As seen in Fig. 1, a spring 38 is extended rearwardly from arm 34 and pivoted to a lever arm 39, fulcrumed on a bracket 40 carried by frame F. Lever arm 39 is fixed or integral with a lever arm 41 which may take an upright position retained by a detent or hook 42. Arm 39 then tensions spring 38 sufficiently to overcome spring 35, thus forcing reel R and its attached parts to the position shown in Fig. 1. In this position, pulley 30 is in frictional contact with tire 19 so that driving of reel R is reestablished. In the position of the parts shown in Fig. 2, lever arm 31 is resting on a stop 43 and lever arm 39 has moved to a position in which spring 38 is relaxed. Spring 35 is therefore free to cause raising of reel R as above described.

Rock shaft 33 also supports shrouds 29 and suitable flare sheets as 44 carried on braces 45 and 46, extended from arms 32 and 31 respectively, the general construction of these being well illustrated in applicant's Patent No. 2,362,861 hereinbefore identified.

A hold down device generally designated as 47, Fig. 1, is provided to prevent blowing of material off of the pickup. This forms no part of the present invention and is well illustrated and described in the above identified patent.

It will now be apparent that a drive for a pickup has been devised, which will accomplish the objects set forth. The operation is thought to be clear from the above, in brief, rotation of wheel W2 causing reverse rotation of pulley 30 which rotates reel R at a rate proportional to the forward travel of the baler. Raising of the reel into inoperative position, in the manner described, removes the friction roller from contact with the rotating tire and avoids needless rotation of the reel.

The above being a complete description of an illustrative embodiment of the invention, what is claimed as new and desired to be secured by Letters Patent of the United States is:

1. In a pickup baler, having a compressing chamber, a feeding conveyor and a pickup reel, said baler also including a supporting wheel, the combination of a support for said pickup reel including an arm carried on the baler for up and down swinging movement, and on which said pickup reel is journaled, means for so swinging said arm for raising and lowering said pickup reel, a shaft for said reel and a driven rotatable member connected in driving relation with the shaft, and said member and said supporting wheel, being so positioned as to be brought into frictional contact with each other by swinging of said arm in one direction for driving said pickup reel from rotation of said supporting wheel.

2. In a baler having a compressing chamber and a transporting wheel, the combination of a pickup means adapted to gather material to be baled, conveyor means to receive said material from said pickup means and convey said material into said compressing chamber, a shaft in driving relation with said pickup means, journal bearings supporting said shaft, arms pivoted to said baler and supporting said journal bearings, and a power transmitting rotatable member fixed in relation with said shaft and adapted to be frictionally engaged with and disengaged from said transporting wheel by swinging of said pivoted arms.

3. In a baler having a compressing chamber, a transporting wheel supporting said baler, a ground engaging means adapted to gather material to be baled, a shaft for said ground engaging means, a frictional drive element operatively connected with said shaft and arranged to contact said transporting wheel, journal bearings supporting said shaft, arms supporting said journal bearings and pivotally supported on said baler so that said frictional drive element may be engaged with or disengaged from said transporting wheel, and means intermediate said ground engaging means and said compressing chamber to convey material to be baled into said compressing chamber.

4. In a pickup baler, in combination a baling case provided with compressing mechanism, a supporting wheel for said baler having an axis, a pickup cylinder, a shaft for said pickup cylinder, journal bearings supporting said shaft, arms pivoted to said baler and connected in supporting relation to said bearings, and means associated with said shaft and arranged to contact said supporting wheel at a point spaced outwardly from said axis so as to rotate said pickup cylinder.

5. In a pickup baler having a baling chamber, a combination of a traction wheel for supporting the baling chamber, a ground-engaging pickup means, a shaft for said pickup means, a frictional drive element secured to said shaft and frictionally engageable with a surface on said traction wheel to rotate said pickup means, and means intermediate said pickup means and said baling chamber to convey material to be baled into said baling chamber.

6. In a pickup baler, in combination, a baling chamber provided with compressing mechanism, a traction wheel supporting said baler, means frictionally engaging a surface on said traction wheel to pick up the material to be baled, and means to convey said material into said baling chamber.

7. A pickup baler having a baling chamber provided with a compressing means and a traction wheel, a rotatable element adapted to lift material to be baled, a drive member integral with said rotatable element and arranged to contact said traction wheel and be frictionally driven thereby, and supporting means for said rotatable element arranged to effect engagement and disengagement between said rotatable element and said traction wheel.

8. In combination, a baler having a body portion, a traction wheel supporting said body portion, a pickup reel adjustable relative to the ground, a shaft integral and co-axial with the said pickup reel, and a friction wheel secured to said shaft and adapted to be brought in contact with said traction wheel so as to operate said pickup reel.

9. A baler comprising in combination a baling chamber, means to convey material into said chamber, traction wheels supporting said chamber a suitable distance from the ground, a pickup reel adjacent the ground, radius arms supporting said reel and pivoted to said baler, a shaft for said reel, and a drive wheel secured to said shaft and in frictional contact with one of said traction wheels.

10. In combination, a baler, a transporting wheel, and a pickup means pivoted to said baler and adapted to be frictionally engaged and disengaged with a surface of said transporting wheel by pivotal movement of said pickup means relatively to said baler.

STANLEY D. RUSSELL.

REFERENCES CITED

The following references are of record in the file of this patent:

UNITED STATES PATENTS

| Number | Name | Date |
|---|---|---|
| 367,278 | Dwelley | July 26, 1887 |
| 1,002,438 | Pedersen | Sept. 5, 1911 |
| 1,857,373 | Goggins | May 10, 1932 |
| 2,044,652 | Walker | June 16, 1936 |
| 2,096,910 | McIntosh | Oct. 26, 1937 |
| 2,294,440 | Barker | Sept. 1, 1942 |
| 2,337,739 | Crumb et al. | Dec. 28, 1943 |
| 2,362,861 | Russell | Nov. 14, 1944 |